No. 616,676. Patented Dec. 27, 1898.
E. H. LARKIN.
CLOTHES REEL.
(Application filed Jan. 14, 1898.)
(No Model.)
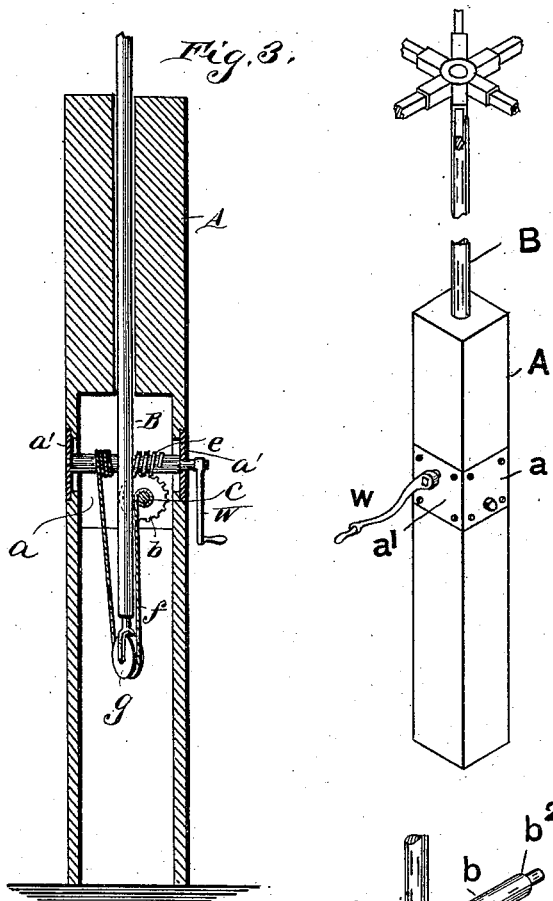
Fig.3.
Fig.1.
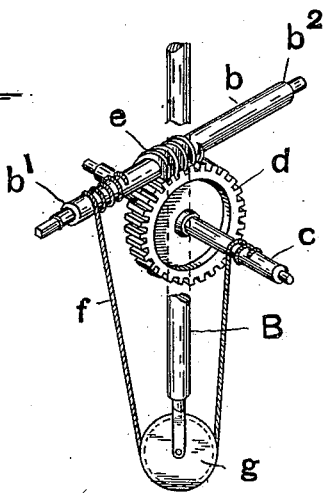
Fig.2.
WITNESSES
Chas Wiener
J. M. Clough.
INVENTOR
Eugene H. Larkin
By Parker & Burton
Attorneys
THE NORRIS PETERS CO., PHOTO-LITHO., WASHINGTON, D. C.

UNITED STATES PATENT OFFICE.

EUGENE H. LARKIN, OF DETROIT, MICHIGAN.

CLOTHES-REEL.

SPECIFICATION forming part of Letters Patent No. 616,676, dated December 27, 1898.

Application filed January 14, 1898. Serial No. 666,603. (No model.)

*To all whom it may concern:*

Be it known that I, EUGENE H. LARKIN, a citizen of the United States of America, and a resident of Detroit, in the county of Wayne and State of Michigan, have invented certain new and useful Improvements in Clothes-Reels, of which the following is a specification.

This invention relates to clothes-reels, and has for its object an improved reel and lifting mechanism therefor.

The base-section of the reel is composed of a post hollow or hollow in parts and inclosing within the hollow gearing by means of which the upper section may be raised and lowered.

In the drawings, Figure 1 shows in perspective the two sections of the reel-post. Fig. 2 shows the gearing removed from its bearings in the post. Fig. 3 shows a longitudinal section of the post.

A indicates the fixed section, and B the movable section, of the post. Of these, A is preferably made of timber, hollow either throughout its entire extent or at least through that part of it into which the movable section sinks.

The fixed section A may be hollowed out from a solid timber by boring or cutting out the interior, or it may be made hollow by building it up from separate parts. Both forms are quite commonly used in clothes-reels which have fixed sections and movable sections. At one portion the hollow is large enough to contain the operative mechanism hereinafter described. Above and below this enlarged part of the cavity the bore may be smaller, and at the extreme summit of the section A the bore or hollow part of the section should be just large enough to allow the stem of the movable part to work easily through it.

$a$ $a'$ indicate bearings or journal-plates properly secured to the post and arranged to receive the two shafts $b$ and $c$. There are of course on the opposite sides of the post bearing-plates similar to $a$ and $a'$, forming the four bearings for the two shafts. The two shafts are at right angles the one to the other, and on one of them, $c$, is a gear-wheel $d$, into which meshes a worm $e$ on the other shaft $b$. The shaft $b$ is provided with shoulders $b'$ $b^2$ to engage against the plate $a'$. The end of the shaft $b$ projects through the bearing $a'$ and terminates with a winch-seat. On the shaft $b$ is wound several coils of a cord $f$, one end of which is secured to the shaft $b$, the other end of which is secured to the shaft $c$. In the bight of the cord $f$ rests a sheave $g$, which supports the lower end of the movable section $b$ of the post.

By starting the wind of the cord on the two shafts, so that one winds as the other unwinds, there can be a differential movement which will give a somewhat greater lifting power with correspondingly less speed than if they are started to wind on both shafts at the same time and unwind from both shafts at the same time. When the weight is lifted, the strain of it on the cord $f$ tends of course to unwind it from both the shaft $b$ and the shaft $c$, and this tends to turn both the shafts; but the turning of the shaft $c$ gives to the shaft $b$ an end thrust, and the end thrust is sufficient, when taken in conjunction with the bearing of the wheel $d$ against the worm $e$, to prevent the weight from turning the gearing backward, and the shaft $b$ being small in comparison with the length of the winch W the movable section with a heavy load on can be easily lifted.

What I claim is—

In a clothes-reel, the combination of a fixed post-section and the movable post-section, a worm and pinion mounted in the fixed section, a line arranged to wind on both the shaft of the worm and the shaft of the pinion and engaging the movable section of the post in the bight of the line, substantially as described.

Signed by me at Detroit this 10th day of January, 1898.

EUGENE H. LARKIN.

Witnesses:
CHARLES F. BURTON,
VIRGINIA M. CLOUGH.